United States Patent
Tapia et al.

(10) Patent No.: US 12,032,058 B2
(45) Date of Patent: Jul. 9, 2024

(54) ADAPTIVE RADAR CALCULATOR

(71) Applicant: GM CRUISE HOLDINGS LLC, San Francisco, CA (US)

(72) Inventors: Daniel Flores Tapia, Fairfield, CA (US); Anton Mario Bongio Karrman, Los Angeles, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 404 days.

(21) Appl. No.: 17/539,843

(22) Filed: Dec. 1, 2021

(65) Prior Publication Data
US 2023/0168366 A1   Jun. 1, 2023

(51) Int. Cl.
*G01S 13/931*   (2020.01)
*G08G 1/16*   (2006.01)

(52) U.S. Cl.
CPC ............ *G01S 13/931* (2013.01); *G08G 1/166* (2013.01); *G01S 2013/932* (2020.01); *G01S 2013/9322* (2020.01)

(58) Field of Classification Search
CPC ........... G01S 13/931; G01S 7/40; G01S 7/23; G01S 2013/932
USPC .................................................. 342/70, 195
See application file for complete search history.

(56) References Cited

U.S. PATENT DOCUMENTS

| | | | | |
|---|---|---|---|---|
| 5,680,137 A | * | 10/1997 | Ando | G01S 13/36 342/127 |
| 8,344,940 B2 | * | 1/2013 | Jeong | G01S 7/4026 342/75 |
| 9,230,443 B2 | * | 1/2016 | Prakah-Asante | G08G 1/166 |
| 11,798,191 B2 | * | 10/2023 | Alvarez | G01S 7/40 |
| 2014/0288775 A1 | * | 9/2014 | Prakah-Asante | G08G 1/166 701/37 |
| 2020/0226790 A1 | * | 7/2020 | Alvarez | G01S 13/865 |
| 2020/0361454 A1 | * | 11/2020 | Takaki | B60W 40/072 |
| 2022/0196798 A1 | * | 6/2022 | Chen | G01S 13/89 |
| 2022/0308204 A1 | * | 9/2022 | Zaidi | G01S 13/426 |

\* cited by examiner

*Primary Examiner* — Vladimir Magloire
*Assistant Examiner* — Michael W Justice
(74) *Attorney, Agent, or Firm* — Michael DiCato (57) ABSTRACT

The present disclosure is directed to a plurality of different software models allowing a processor to perform calculations associated with different sets of criteria using data associated with variables that have a strong correlation with one or more of the different criteria sets. Methods consistent with the present disclosure may use several different sets of software that include instructions associated with the collection and evaluation of data associated with a vehicle and with an automated driving system. Different criteria sets may be associated with a range of operating modes, spectral content of received signals, phases of radar signals, and an angular coverage/field of view of the radar apparatus. Results generated by each of the software models may allow a processor to assign weights to the results generated by the different models to generate a combined result that in turn is used to update an operational mode of the radar apparatus.

20 Claims, 5 Drawing Sheets

ADAPTIVE RADAR CALCULATOR

BACKGROUND

1. Technical Field

The disclosed technology is directed to improvements of radar systems. More specifically the present disclosure is directed to methods that dynamically adjust operational parameters of a radar apparatus

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide a safe and efficient transportation. Such tasks may require the collection and processing of large quantities of data using various sensor types, including but not limited to cameras and/or Light Detection and Ranging (LiDAR) sensors, and radar elements disposed on the AV.

Current automotive radars are designed to irradiate a series of predefined waveforms intended for generic scenarios. The design paradigm of these current automotive radars is based on an assumption that a human is always in the driver seat and is ready to take control of the vehicle when a driving apparatus of an autonomous vehicle makes an error.

The use of predefined waveforms in current automotive radars of automated driving systems is not well suited in truly autonomous vehicles when a human may not be available to take over control from the automated driving system. Radar operating mode design is a multidimensional problem where the variables are strongly correlated. Compared to LiDAR and camera sensors, radar modes require the use of at least an additional five parameters, making radar mode design a difficult and time-consuming task as compared to systems that use LiDAR and camera sensors. What are needed are new methods and apparatus that improve radars included in AVs and that reduce the amount of time required to design AV based radar systems.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is a plurality of different software models allowing a processor to perform calculations associated with different sets of criteria using data associated with variables that have a strong correlation with one or more of the different criteria sets. Methods consistent with the present disclosure may use several different sets of software that include instructions associated with the collection and evaluation of data associated with a vehicle and with an automated driving system. Different criteria sets may be associated with a range of operating modes, spectral content of received signals, phases of radar signals, and an angular coverage/field of view of the radar apparatus. Results generated by each of the software models may allow a processor to assign weights to the results generated by the different models to generate a combined result that in turn is used to update an operational mode of the radar apparatus.

Figure 1:
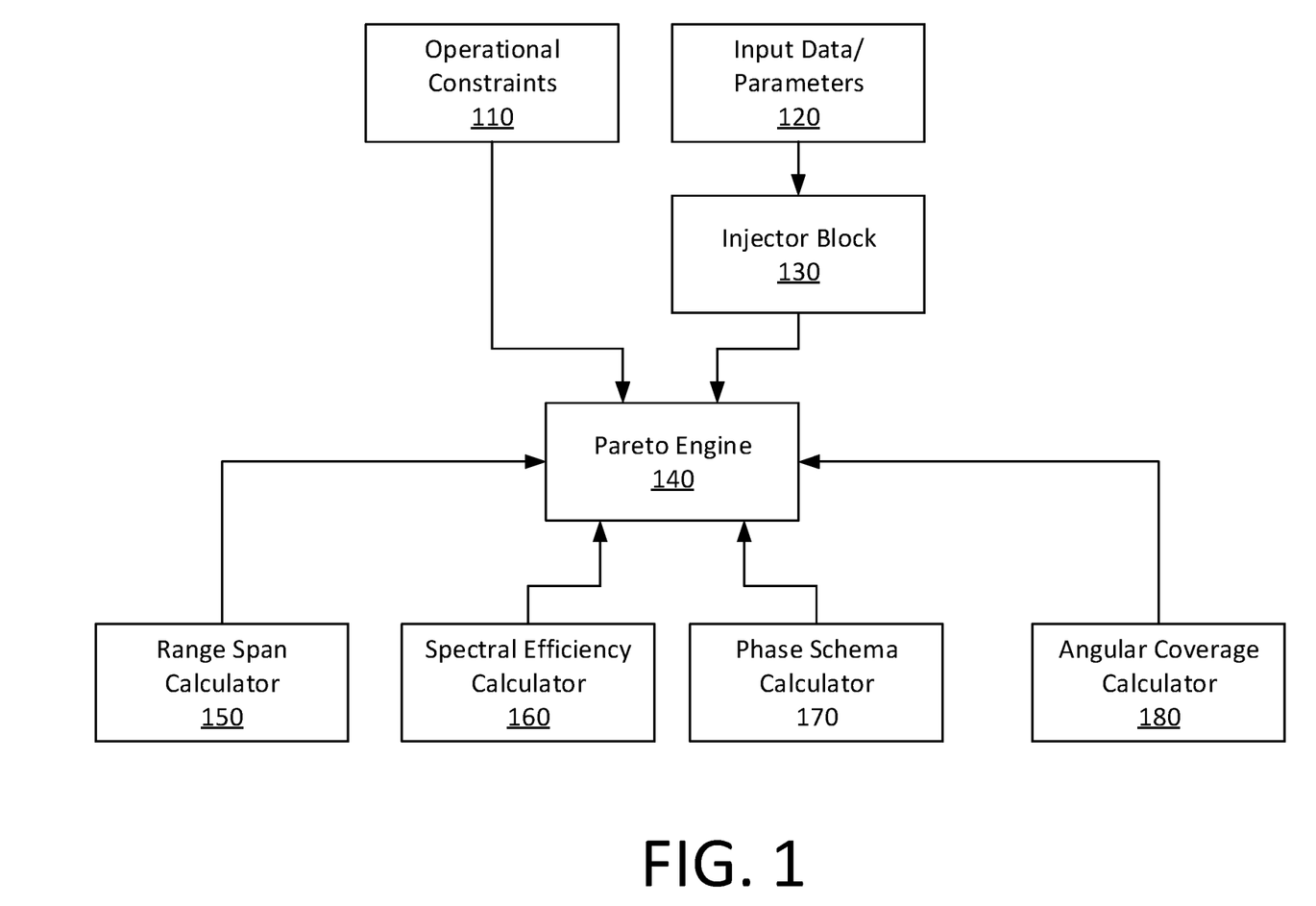
FIG. 1 illustrates various different elements of a radar system configured to evaluate radar data from different perspectives.

FIG. 1 illustrates various different elements of a radar system configured to evaluate radar data from different perspectives. Such a radar system may include numerous different sets of instructions that may be executed by one or more processors to evaluate radar data. Here a processor may receive data that identifies operational constraints 110 and input data or parameters 120. Input data or parameters 120 may be provided to the processor via injector block 130 that may collect information associated with a state of a vehicle and with information regarding spaces around the vehicle.

Operational constraints 110 may be a set of data used to optimize the operation of the vehicle radar apparatus when the automated vehicle is operating. The input data and input parameters 120 may include different sets of state information that may be used to enhance the evaluations performed by execution of the different sets of software included in FIG. 1. These different sets of state information may be referred to as vehicle state information (or ego state information) and state information associated with spaces around the vehicle may be referred to as scene state information.

Injector block 130 may be associated with a first set of software that is directed to the collection of information associated with the vehicle state information and the scene state information. Vehicle state information or data associated with the state of the vehicle may include a speed or velocity of the vehicle, stopping distances associated with the vehicle in various conditions, and data associated with operational state of sensors (LiDAR, camera, or radar) located at the vehicle. Environmental or scene state information may identify or include a number of objects (i.e.

actors) in the vicinity of the vehicle, weather conditions where the vehicle is located, and/or a type of roadway that the vehicle is driving along. The purpose of injector block 130 is to provide vehicle state or scene state information to processors executing one or more other sets of software instructions that control operation of the radar apparatus.

FIG. 1 includes several different sets of instructions that may be executed by a processor or multiple processors. These sets of instructions include a range-span calculator set of instructions 150, a spectrum efficiency calculator set of instructions 160, a phase schema calculator set of instructions 170, an angular coverage calculator set of instructions 180, and a pareto engine set of instructions 140. Each of these different sets of instructions (140, 150, 160, 170, & 180) may be a discrete software model that performs evaluations within operation constraints 110 based on input data and/or input parameters 120. Instructions of each of these respective software modules may generate results used to control the operation of the radar apparatus.

Instructions of the range span calculator 150 may be directed to allowing a processor to evaluate a range of a radar system at different vehicle velocities. This velocity-range software 150 may include instructions that allow a processor to evaluate velocities and spans of distances (velocity-rage data) that the radar system can sense for a given set of constraints or different operational modes of the radar system. This may allow the processor to identify a maximum span of distances that the radar can sense as the vehicle moves along a roadway. For example, when the vehicle is moving at highway speeds (e.g. greater than 45 miles per hour) down a multi-lane highway, a first set of constraints (e.g. a subset of operational constraints 110) may be used to identify frequencies emitted by the radar apparatus based on the vehicle moving at highway speeds down the multi-lane highway. Here, the radar frequencies emitted may be relatively higher frequencies than radar frequencies used at lower driving speeds.

Different radar frequencies may be used at different speed ranges as the vehicle drives down the multi-lane highway. For example, a first set of frequencies may be used when the vehicles is moving at speeds between 45 and 55 miles per hour (MPH), a second set of frequencies may be used at speeds between 55 and 75 MPH, and a third set of frequencies may be used when the vehicle is moving at speeds above 75 MPH. Emitted radar frequencies may be increased as the speed of the vehicle increases. The use of higher radar frequencies may result in an effective range apparatus of the radar being increased and may result in an effective decrease in a field of view (i.e. a reduced angular coverage) of the radar apparatus.

In another instance, when the vehicle is driving in urban or city conditions, lower radar frequencies may be emitted according to an operational mode that corresponds with either urban or city driving. These lower radar frequencies may result in an effective range of the radar apparatus being reduced while the effective field of view of the radar apparatus is increased. The increase in the field of view and lower radar frequencies may allow the radar apparatus to identify objects and distinguish between different objects near the vehicle more accurately then when higher radar frequencies are used.

Generally, physical dynamics of a radar apparatus are associated with an ability of a radar apparatus to identify rapidly occurring changes in a limited field of view when relatively higher radar frequencies are used. The physical dynamics of the radar apparatus are also generally associated with an ability of a radar apparatus to identify objects around the vehicle more distinctly when relatively lower radar frequencies are used. This means particular radar frequencies selected for use may trade off an ability of the radar apparatus to perceive relatively quick changes over a distance farther from the vehicle versus an ability of the radar apparatus to distinctly identify objects located closer to the vehicle.

Higher and lower frequencies, pulse widths, and beam widths of transmitted signals may be used to adjust an angular resolution or range resolution of a radar apparatus. Transmitted pulse widths and frequencies may be varied by settings at a radar apparatus and beam widths of transmitted signals may be varied by using different antennas at a radar apparatus that have different physical attributes. Typically, range resolution is related to an ability of a radar apparatus to distinguish between two or more objects located at a same bearing yet at different ranges (distances) from the radar apparatus. Angular resolution typically is related to the radar apparatus being able to distinguish between two different objects that have reflect similar strengths of radar energy. In certain instances, settings of a radar apparatus and specific antennas at a radar apparatus used by a radar apparatus may increase range resolution while reducing angular resolution or visa versa.

Another, set of software (the spectral efficiency calculator 160 of FIG. 1) may be directed to allowing a processor to evaluate the spectral efficiency of an operational mode of the radar system. Instructions of this spectral efficiency software set 160 may allow a processor to identify when a current operational mode of the radar may interfere with a radar system of a "nearby" vehicle. When a radar of another vehicle that has similar spectral content as radar signals being emitted by a radar apparatus of an AV is detected, operation of the AV radar apparatus may be changed. This may include reducing an amount of emitted radar energy or may include changing operational frequencies of the AV radar apparatus.

The phase schema calculator set of instructions 170 of FIG. 1 may be directed to allowing a processor to evaluate phase offsets of transmitted radar signals. The processor may execute instructions of this phase offset schema calculator 170 to determine whether phases of different radar transmitters should be changed or kept the same. Depending on determinations made by the processor, each of a set of radar transmitters could transmit a same radar signal with a same phase, could transmit a same radar signal from different transmitters with different phases, or could transmit different radar signals from different transmitters. Instructions of the phase schema calculator 170 software may allow a processor to change radar signals or phases of those radar signals when the processor is evaluating reflected radar signals. This may include changing between multiple input and multiple output modes when the processor makes determinations with a low latency.

Instructions of the angular coverage calculator 180 software of FIG. 1 may be directed to allowing a processor to evaluate angular coverage of a radar system. This may allow the processor to adjust an effective field of view of the radar system. The processor executing instructions of this angular coverage 180 software may allow the processor to make adjustments regarding angular coverage of the radar system based on scene state information and vehicle state information. The field of view discussed above may be associated with an angular coverage of a particular radar operating mode. Here a larger field of view may correspond to a larger angular coverage of a radar apparatus and a smaller field of view may correspond to a smaller angular coverage of a radar apparatus.

Another set of software instructions of FIG. 1 (the pareto engine 140 software instructions) may be directed to allowing a processor to evaluate, prioritize, and weight determinations made by execution of instructions associated with the velocity-range software 150, the spectral efficiency software 160, the phase offset software 170, and the angular coverage of the radar system 180. Determinations made by the execution of the instructions of the different software sets may contradict or contrast with each other. These determinations may identify whether a radar apparatus should be adjusted to increase either range resolution or angular resolution of the radar apparatus. For example, increased range resolution may results in or impact a maximum range and/or update rate of the radar apparatus. As mentioned above an increase in range resolution may result in a reduction of angular resolution. Careful balancing of the importance of each one various parameters is crucial to improving the utility of a radar apparatus as conditions change. Instructions of this pareto optimization engine 140 software may use vehicle state and scene state information when making evaluations, identifying priorities, and assigning weights to determinations or results made by the other sets of software operating at the radar apparatus. The evaluations made by a processor executing instructions of the pareto optimization software 140 may allow the processor to identify how the radar system should be adjusted such that final determinations can be made within a desired time frame or within a threshold time frame. These evaluation times may be associated with the other operational constraints 110 and input data/parameters 120. Here, the weights assigned to results output from the different software sets may be used to increase the relevance of a first set of results over one or more other sets of results.

Some of the most important state information associated with operation of a vehicle radar system may include data that identifies a velocity of the vehicle, a type of roadway that the vehicle is moving along, objects identified in a field of view of the radar system, weather conditions, and the presence or status of sensors (e.g. LiDAR, cameras, or radar elements) located at the vehicle.

As mentioned above a first set of operating conditions of a radar system may be initially set based on information that identifies that the vehicle is driving along a multilane highway at highway speeds. This first set of operating conditions may be associated with a nominal highway operational mode of the radar system. These operating conditions may include a number of bursts of a given radar frequency, where each burst may include a number of periods of the radar frequency. Here each discrete burst of radar energy may be referred to as a chirp. For example, a set of 5 bursts could include 5 different chirps, where each chirp could include a radar signal of 10 cycles (periods) at frequency F. Each respective chirp could be separated by a time delay of T.

When a relatively higher frequency is transmitted, that higher frequency may be associated with a narrower field of view of the radar as compared to fields of view associated with lower frequencies. Operating conditions may be maintained by the radar system until execution of one or more of the different sets of software make determinations that identify that the operating conditions of the radar system should be changed. For example, a change in the speed of vehicles on the highway, the AV exiting the highway, or a change in weather may result in changing conditions or modes of a radar apparatus being changed.

Figure 2:
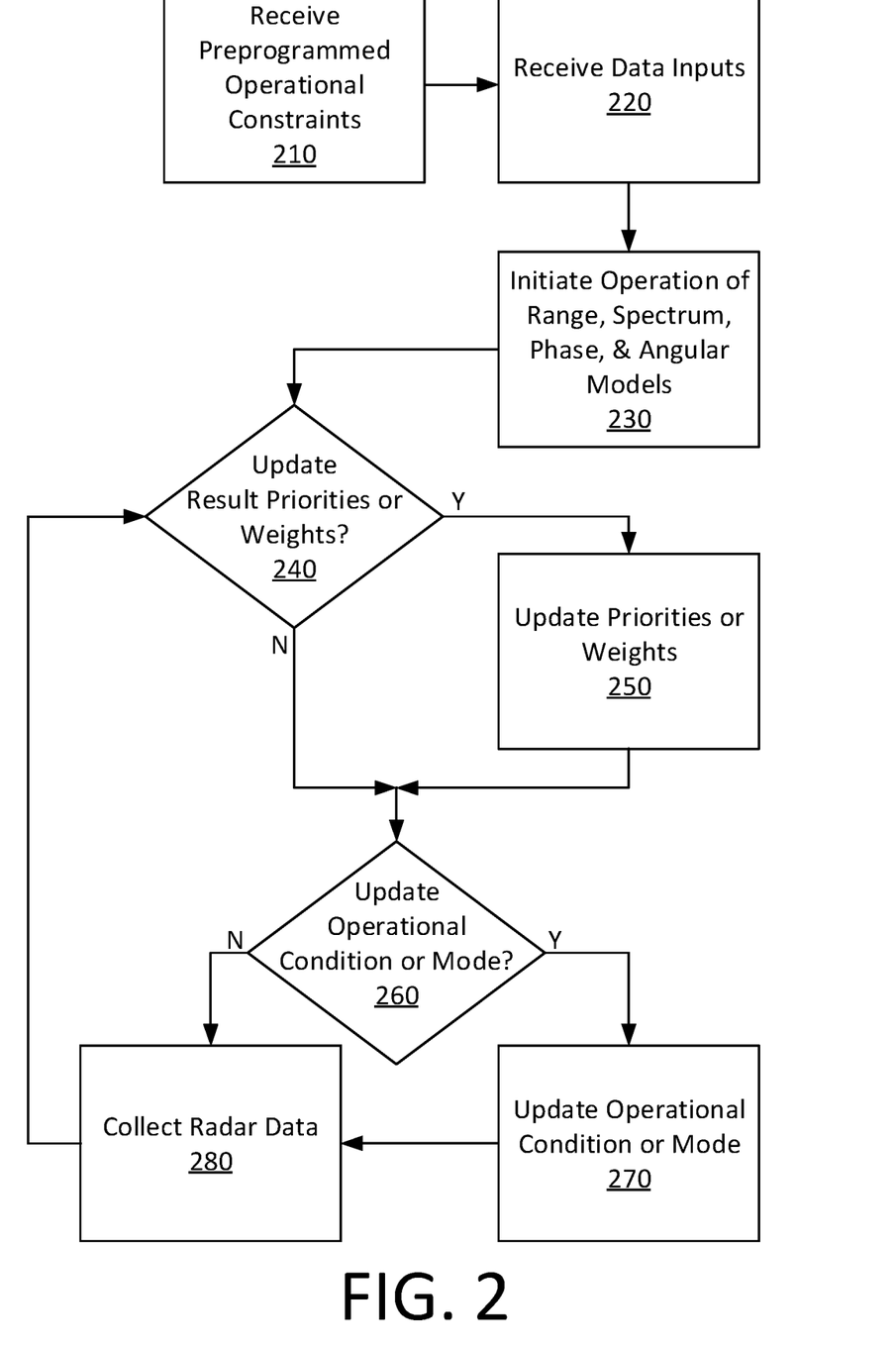
FIG. 2 illustrates a series of steps that may be associated with the execution of instructions of one or more sets of software by one or more processors that control operation of a radar apparatus

FIG. 2 illustrates a series of steps that may be associated with the execution of instructions of one or more sets of software by one or more processors that control operation of a radar apparatus. In step 210 of FIG. 2 a set of operational constraints may be received. These operational constraints may have been predetermined or preprogrammed and may be the same constraints as the operational constraints 110 of FIG. 1.

Next in step 220 of FIG. 2 input data or parameters may be received this may include data received from the vehicle that may identify a speed of the vehicle. Input data may also identify weather conditions or other information. After step 220, operation of different instructions of software models may be initiated. This may include initiating the operation of the range spectrum calculator 150, the spectral efficiency calculator 160, the phase schema calculator 170, and the angular coverage calculator 180 of FIG. 1. In certain instances, instructions of each of the different software modules may be executed by one or more different processors of a multiprocessor system. In other instances, a single processor may perform all functions of the radar apparatus.

Processors executing these tasks may be any type of or any combination of processors known in the art (e.g. a conventional processor/multiprocessor, a graphical processing unit (GPU), or a digital signal processor (DSP). Alternatively or additionally, the steps of FIG. 2 may be performed by an applications specific integrated circuit (ASIC) or a field programmable gate array (FPGA).

The initiation of the operation of the different models in step 230 of FIG. 2 may result in the radar apparatus emitting radar energy according to an operational mode that may be associated with the operation constraints, received data inputs, and/or received parameters.

Next, determination step 240 may identify whether priorities or weights of results generated by the range spectrum calculator 150, the spectral efficiency calculator 160, the phase schema calculator 170, and the angular coverage calculator 180 of FIG. 1 should be updated. When yes, program flow may move to step 250 where those priorities or weights are updated. Determination step 240 and step 250 may be performed by processor executing instructions of the pareto engine 140 of FIG. 1.

When determination step 240 identifies that the priorities or weights should not be updated or after step 250, program flow may move to determination step 260 that identifies whether an operational condition or mode of the radar apparatus should be updated. Here an operational condition may be a minor update to a current operational mode of the radar (e.g. a slight change in frequency or phase) and a change of an operational mode may correspond to a different mode that uses significantly different operational conditions or parameters.

When determination step 260 identifies that the operational condition or mode of the radar apparatus should be updated, program flow may move to step 270 where the operational condition or mode is updated. When determination step 260 identifies that the operational condition or mode of the radar apparatus should not be updated or after step 270, program flow may move to step 280 where additional radar data is collected. Step 280 may include transmitting additional radar pulses consistent with a current operational condition or mode of the radar apparatus and may include receiving radar signals that have been reflected from objects in or around the vehicle. Step 280 may also be a step where one or more processors executing instructions of the different software models discussed above may make additional evaluations and generate additional results. After step 280, program flow may move back to determination step 240 where once again a determination is made as to whether result priorities or weights should be updated.

Relationships associated with different operating constraints and different sets of data or parameters may result in results generated by execution of one set of instructions being different from or diametrically opposed to results generated by execution of a second set of instructions. This is why execution of the instructions of the pareto engine 140 may use operational constraints and input data/parameters to identify how relevant results from the range span calculator set of instructions 150, the spectrum efficiency calculator set of instructions 160, the phase schema calculator set of instructions 170, and the angular coverage calculator set of instructions 180 are used in a given instance.

changed. Here, the operational constraints may be used to identify which data, parameters, or settings should be changed based on rules associated with the pareto engine.

Table 1 also includes information sets that are associated with weather (e.g. a type of snow, a type of rain, or foggy conditions). The radar frequency may be associated with knowledge of limitations of other sensors used to operate the AV. Snow, rain, and/or fog may limit the effectivity of a camera sensor or a LiDAR sensor to detect objects around a vehicle and operation of the radar apparatus may be updated to compensate for these limitations. Changes to the operating mode may also be a function of the road type and stopping distance. This is because weather conditions can affect the performance of a vehicle or radar apparatus dependent upon the road type and how weather affects stopping distance and vehicle sensors.

TABLE 1

| Pareto Evaluation Data | | | | | | |
|---|---|---|---|---|---|---|
| Information Set #1 | Velocity | Frequency | Range | Angular Coverage | Road Type | |
| Information Set #2 | Velocity | Detected Spectral Content | Range | Power | | |
| Information Set #3 | Velocity | Frequency | Phase | Angular Coverage | Road Type | |
| Information Set #4 | Snow Type | Frequency | Other Sensor Limitation | Velocity | Road Type | Stopping Distance |
| Information Set #4 | Rain Type | Frequency | Other Sensor Limitation | Velocity | Road Type | Stopping Distance |
| Information Set #4 | Fog | Frequency | Other Sensor Limitation | Velocity | Road Type | |

As mentioned above, input data or parameters may include vehicle state information and scene state information. One of the most important pieces of vehicle state information is a velocity of the vehicle and some of the most important types of scene state information include a type of roadway, a number objects near the vehicle (i.e. a number of actors), and a type of weather. Sets of information may be correlated by a processor executing instructions of the pareto engine 140 of FIG. 1 to identify whether or how a current operational mode of the radar apparatus should be updated.

Table 1 illustrates sets of information that may be used by a processor executing instructions of the pareto engine discussed above. Each of the different information steps of table 1 include data that may be identified as input data or parameters. Here again this input data and parameters may correspond to vehicle state data or scene state data. Information set number 1 of table 1 cross-references a relevancy of velocity, radar frequency, an expected effective range, a power of radar energy being transmitted, and a type of road along which the vehicle is moving. This data may be used by the pareto engine to identify that when the vehicle is traveling down a highway, it may travel down the highway at a posted speed limit using a default radar frequency at a specified power level. Here, operational constraints associated with the first information set may be primarily related to the road type that in turn may be associated with a speed limit, a radar frequency, and an amount of radar power used.

A second set of information in table 1 cross references velocity, detected spectral content, effective radar range, and radar power. Detected spectral content may correspond to an identification that the radar apparatus is receiving radar energy from another vehicle and this determination may be used by a processor executing instructions of the spectral efficiency calculator 160 of FIG. 1 to identify whether the frequency or power of an emitted radar signal should be The data of table 2 illustrates other information that may be used by a processor executing instructions of pareto engine 140 of FIG. 1. The data of table 2 cross-references a roadway type with a given constraint (e.g. nominal weather, snow/ice, rain, fog, or emitted power), a following distance, and other potential limiting factors (e.g. a discrimination ability, a constraint dictated by the Federal Communications Commission (FCC), a location, or other limiting factors). Note that a first row of table 2 identifies that when the AV is driving down a highway under nominal weather conditions that the AV should maintain a following distance of 1 car length per 10 miles per hour (MPH) of vehicle speed. This first row of data may also be associated with a discrimination ability that may be associated with detecting an anomaly (e.g. an object that may be a person, an animal, or debris) on the highway. Data associated with the discrimination ability may provide a result that indicates that an operational mode of the radar apparatus should be changed such that risks associated with a particular object can be evaluated better or be reduced. This data may also assist in identifying whether an operational mode of the radar should be changed to determine whether a set of reflected radar energy is associated with a single object or with more than one object. For example, a person standing next to a vehicle located on a divider portion of the highway could be detected more accurately based on a change in an operational mode of the radar apparatus.

In an instance when an anomalous condition may be associated with a set of reflected radar data, a frequency, phase, or field of view of the radar apparatus may be changed momentarily such that the radar apparatus may collect data more suitable to identifying what a particular object is or to discriminate between two different objects.

Results provided to a processor executing instructions of a pareto engine may evaluate data stored in tables 1 and 2 when setting priorities or weights to assign to results generated by execution of instructions of different sets of program code. A range-span calculator may use operational constraints associated input data/parameters to generate a result to provide the processor executing instructions of the pareto engine. Here the result provided by the range-span calculator may recommend using a current set of radar frequencies by a radar apparatus at an AV based on the vehicle driving down a multilane highway under nominal weather conditions. This may occur at a time when the spectral efficiency calculator provides a result indicating that the emitted radar frequency should be changed to frequencies that avoid spectral content of the current set of radar frequencies based on a determination that a nearby vehicle is using frequencies with a similar spectral content. This may cause a processor executing instructions of the pareto engine identifying that the result provided by operation of the range-span calculator should be given a low weight (e.g. of 0.5) and that the weight of the result provided by operation of the spectral efficiency calculator be given high weight (e.g. of 10). This would result in the weight of the spectral efficiency calculator being raised above the result of the range-span calculator. This may cause the processor executing the instructions of the pareto engine to change operational frequencies of the radar instead of maintaining the same frequencies.

The various sets of data of table 1 and table 2 may be used to instruct the AV to drive the vehicle according to operational constraints associated with a roadway type, current weather conditions, or current discrimination abilities. Note that following distances of FIG. 2 change depending on the roadway type and current weather conditions. Generally, adverse weather conditions are associated with a greater following distance. Under nominal conditions on a highway, the following distance is one car length per 10 MPH of vehicle speed and under snowy/icy conditions on the highway, the following distance is increased to four car lengths per 10 MPH of vehicle speed.

Note also that the data of table 2 indicates that an amount of emitted power may be varied based on FCC requirements, a location, or other constraints.

TABLE 2

| Roadway Type | Given Constraint | Following Distance | Other Limiting Factor |
|---|---|---|---|
| Highway | Nominal Weather | 1 car length per 10 MPH | Discrimination Ability |
| Residential | Nominal Weather | 1 car length per 10 MPH | |
| Urban | Nominal Weather | 1 car length per 10 MPH | |
| Highway | Snow/Ice | 4 car lengths per 10 MPH | Discrimination Ability |
| Residential | Snow/Ice | 2 car lengths per 10 MPH < 30 MPH | |
| Urban | Snow/Ice | 2 car lengths per 10 MPH < 30 MPH | |
| Highway | Rain | 3 car lengths per 10 MPH | Discrimination Ability |
| Residential | Rain | 2 car lengths per 10 MPH < 30 MPH | |
| Urban | Rain | 2 car lengths per 10 MPH < 30 MPH | |
| Highway | Fog | 2 car lengths per 10 MPH | Discrimination Ability |
| Residential | Fog | 2 car lengths per 10 MPH | |
| Urban | Fog Emitted Power | 3 car length per 10 MPH | FCC Requirement, Location, Other |

Figure 3:
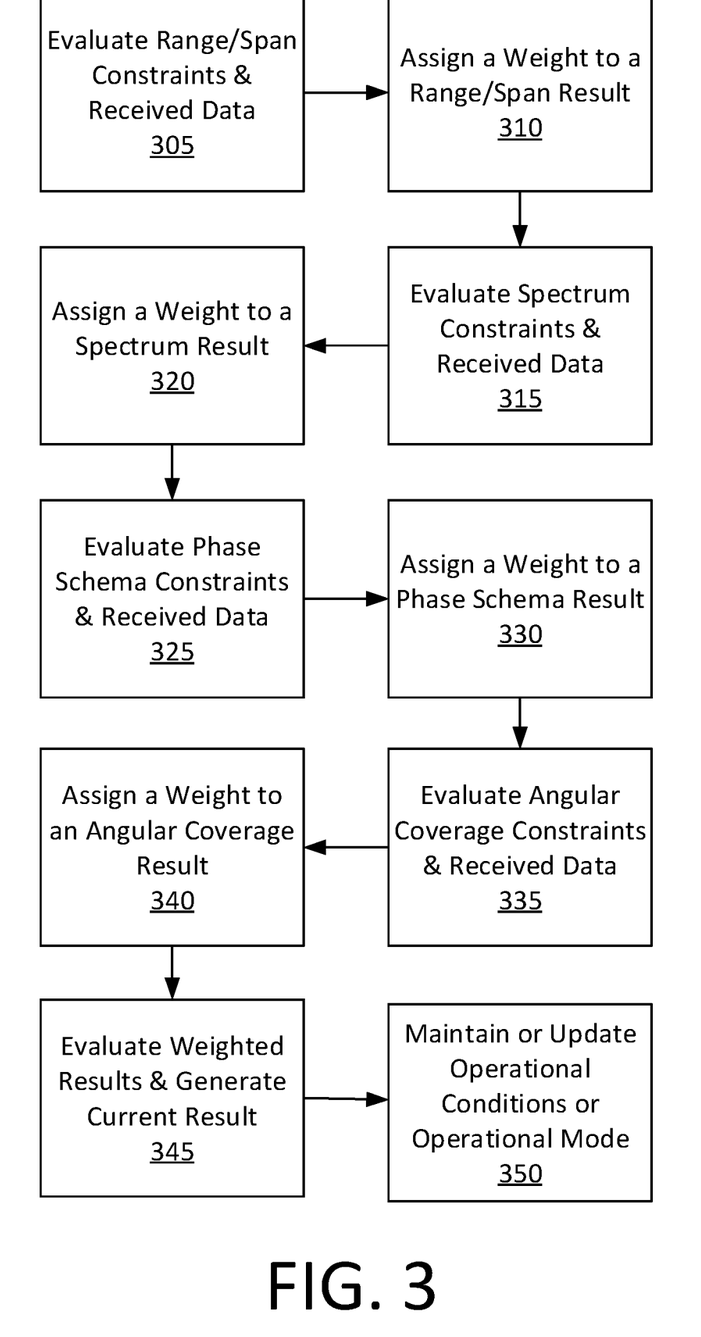
FIG. 3 illustrates a series of steps that may be performed when a radar apparatus is used.

FIG. 3 illustrates a series of steps that may be performed when a processor executing instructions of a set of pareto engine program code adjusts priority or weights of results performed by the different sets of program code. FIG. 3 begins with step 305 where an evaluation is performed that compares constraints associated with a range-span calculation with received data. A result may then be generated by a processor executing instructions of the range-span calculator 150 of FIG. 1. Next in step 310, a weight may be assigned to the result generated by the range span calculator 150. For example, for long range sensing scenarios (i.e. highways) sensor maximum range, velocity span and frame rate may be provided a much stronger weight than angular resolution. This is due to the need to see fast moving objects farther away and this may be a primary use case of radar sensors in long range operation scenarios. The rang-span constraints may be related to a following distance associated with the general flow of traffic down a highway during normal weather conditions. Alternatively, the range-span constraints may be associated with a number of objects around along the path of the vehicle or may be associated with driving conditions of an urban roadway. The received data of step 305 may be the input data/parameters discussed above and this data may include vehicle velocity, weather conditions, number of vehicles within a proximal distance of the vehicle, or other data. This data may be received from speed sensors at the vehicle or from other sensor types (e.g. a camera or LiDAR sensor).

Step 315 of FIG. 3 may evaluate spectrum constrains with received data. Here the received data may be associated with frequencies used by a radar of a nearby vehicle and the spectrum constraints may be associated with conditions for changing an amount of radar power emitted or with changing the operational frequency of the radar at the vehicle. Next in step 320, a weight may be associated with a spectrum result indicating that a nearby vehicle is using a radar frequency that overlaps with a radar frequency used by the vehicle. This weight may vary based on an amplitude of signal associated with the other radar or may be associated with an amount of energy that overlaps with spectral content of a current operating frequency of the radar.

Step 325 of FIG. 3 may evaluate phase schema constraints with received data. This step may also include generating a phase schema result and then a weight may be assigned to that phase schema result in step 330. Phase schema constraints may be associated with a particular frequency range and with an ability of the radar apparatus to discriminate between reflections from objects. The phase schema result may include a recommendation to change phases between signals emitted from different radar transmitters at the radar apparatus. This may allow the radar apparatus to better discriminate between objects that are close to one another. So instead of decreasing frequency to increase field of view, a same frequency with different phases may be recommended in a result provided to the processor executing instructions of the pareto engine 140 of FIG. 1.

After step 330, step 335 of FIG. 3 may evaluate angular coverage constraints and received data after which an angular coverage constraint may be generated. This angular coverage result may be assigned a weight in step 340. Angular coverage constraints may be associated with vehicle speed and a radar frequency. An angular coverage of the radar may correspond to distinct fields of view of the radar. Weights associated with the angular coverage, the range-span results, and with the phase schema results may provide complementary or contradicting/contrasting results to pareto engine 140 of FIG. 1. A good example of this would be tradeoff between angular and range resolution and probability of interference when a radar apparatus operates in urban scenarios. Urban scenarios typically require a high range/angular resolution, which is highly dependent on the bandwidth of the radiated signal. However, the larger the bandwidth, the larger the probability of interference with other radars in the scene will be. The weights combined with input parameters may be used to identify a change to apply to an operational mode of the radar apparatus. All of this information may be used by the processor executing the instructions of the pareto engine when a current result is generated in step 345. Finally, in step 350 a current operational mode of the radar may be maintained or updated according to the combined result.

Operational conditions of a radar apparatus may include a frequency of emitted radar pulses, a number of pulses to emit per unit time, or a minor change to a current operational mode. Each operational mode may be associated with a plurality of settings or parameters that adjust minor aspects of a current operational mode. Operational modes of a radar apparatus may be associated with frequencies used when the vehicle is driving down a residential roadway or on a road in an urban setting where there may be many slow-moving objects that should be evaluated. One operational mode may be associated with a frequency modulated form of radar transmission that relies more upon Doppler shift and a second operational mode may be associated with the transmission of pulses of radar energy at a constant frequency.

Radio Detection and Ranging (radar) sensors collect data about an environment by receiving reflected electromagnetic waves that can be used to determine certain properties about the reflecting objects. Radar sensors can be used to measure location parameters for various objects, including an angle of azimuth, a range, and an elevation. In common deployments, elevation measurements can indicate an object location along a vertical axis, e.g., with respect to the ground. However, depending on the desired orientation of the radar's antennae, elevation measurements can be used to generate location measurements along other axial orientations or directions.

In some radar deployments, elevation measurements can be noisy, as compared to measurements for azimuth and range. By way of example, in typical radar deployments, elevation errors can commonly be in the range of ±20 meters of an object's actual location. Due to the measurement error attendant in radar elevation measurements, radar signals have limited use for applications in which highly accurate localization information is needed, such as in the deployment of autonomous vehicles (AVs).

Figure 4:
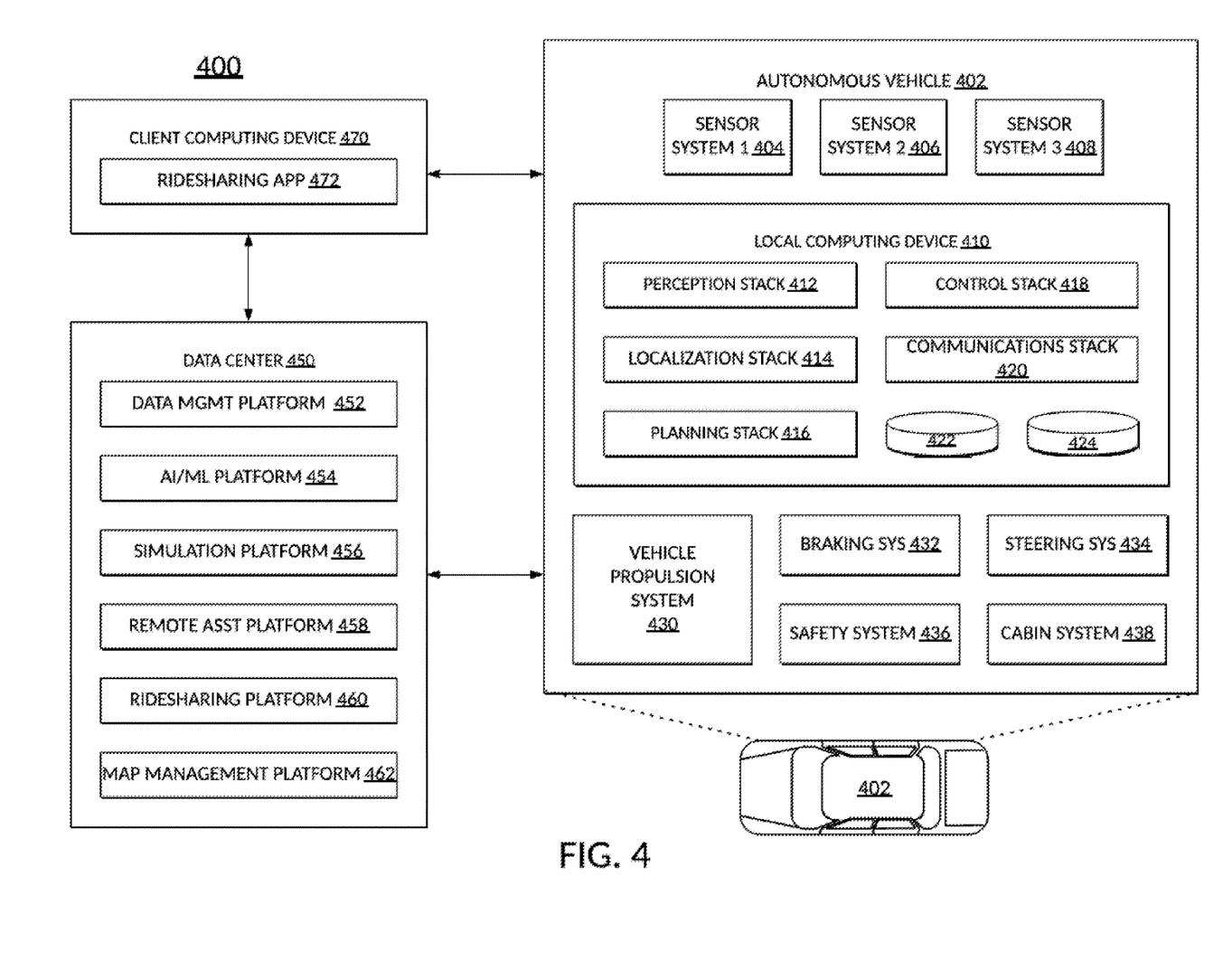
FIG. 4 illustrates an example system environment that can be used to facilitate AV dispatch and operations, according to some aspects of the disclosed technology.

FIG. 4 illustrates an example system environment that can be used to facilitate AV dispatch and operations, according to some aspects of the disclosed technology. FIG. 4 illustrates an example of an AV management system 500 of FIG. 5. One of ordinary skill in the art will understand that, for the AV management system 400 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 400 includes an AV 402, a data center 450, and a client computing device 470. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 402 can navigate about roadways without a human driver based on sensor signals generated by multiple sensor systems 404, 406, and 408. The sensor systems 404-408 can include different types of sensors and can be arranged about the AV 402. For instance, the sensor systems 404-408 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LIDAR system, and the sensor system 408 can be a RADAR system. Other embodiments may include any other number and type of sensors.

AV 402 can also include several mechanical systems that can be used to maneuver or operate AV 402. For instance, the mechanical systems can include vehicle propulsion system 430, braking system 432, steering system 434, safety system 436, and cabin system 438, among other systems. Vehicle propulsion system 430 can include an electric motor, an internal combustion engine, or both. The braking system 432 can include an engine brake, brake pads, actuators, and/or any other suitable componentry configured to assist in decelerating AV 402. The steering system 434 can include suitable componentry configured to control the direction of movement of the AV 402 during navigation. Safety system 436 can include lights and signal indicators, a parking brake, airbags, and so forth. The cabin system 438 can include cabin temperature control systems, in-cabin entertainment systems, and so forth. In some embodiments, the AV 402 may not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces (e.g., Graphical User Interfaces (GUIs), Voice User Interfaces (VUIs), etc.) for controlling certain aspects of the mechanical systems 430-438.

AV 402 can additionally include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a mapping and localization stack 414, a planning stack 416, a control stack 418, a communications stack 420, an HD geospatial database 422, and an AV operational database 424, among other stacks and systems.

Perception stack 412 can enable the AV 402 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the mapping and localization stack 414, the HD geospatial database 422, other components of the AV, and other data sources (e.g., the data center 450, the client computing device 470, third-party data sources, etc.). The perception stack 412 can detect and classify objects and determine their current and predicted locations, speeds, directions, and the like. In addition, the perception stack 412 can determine the free space around the AV 402 (e.g., to maintain a safe distance from other objects, change lanes, park the AV, etc.). The perception stack 412 can also identify environmental uncertainties, such as where to look for moving objects, flag areas that may be obscured or blocked from view, and so forth.

Mapping and localization stack 414 can determine the AV's position and orientation (pose) using different methods from multiple systems (e.g., GPS, IMUs, cameras, LIDAR, RADAR, ultrasonic sensors, the HD geospatial database 422, etc.). For example, in some embodiments, the AV 402 can compare sensor data captured in real-time by the sensor systems 404-408 to data in the HD geospatial database 422 to determine its precise (e.g., accurate to the order of a few centimeters or less) position and orientation. The AV 402 can focus its search based on sensor data from one or more first sensor systems (e.g., GPS) by matching sensor data from one or more second sensor systems (e.g., LIDAR). If the mapping and localization information from one system is unavailable, the AV 402 can use mapping and localization information from a redundant system and/or from remote data sources.

The planning stack 416 can determine how to maneuver or operate the AV 402 safely and efficiently in its environment. For example, the planning stack 416 can receive the location, speed, and direction of the AV 402, geospatial data, data regarding objects sharing the road with the AV 402 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 402 from one point to another. The planning stack 416 can determine multiple sets of one or more mechanical operations that the AV 402 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 416 can select from multiple backup plans to carry out. For example, while preparing to change lanes to turn right at an intersection, another vehicle may aggressively cut into the destination lane, making the lane change unsafe. The planning stack 416 could have already determined an alternative plan for such an event, and upon its occurrence, help to direct the AV 402 to go around the block instead of blocking a current lane while waiting for an opening to change lanes.

The control stack 418 can manage the operation of the vehicle propulsion system 430, the braking system 432, the steering system 434, the safety system 436, and the cabin system 438. The control stack 418 can receive sensor signals from the sensor systems 404-408 as well as communicate with other stacks or components of the local computing device 410 or a remote system (e.g., the data center 450) to effectuate operation of the AV 402. For example, the control stack 418 can implement the final path or actions from the multiple paths or actions provided by the planning stack 416. This can involve turning the routes and decisions from the planning stack 416 into commands for the actuators that control the AV's steering, throttle, brake, and drive unit.

The communication stack 420 can transmit and receive signals between the various stacks and other components of the AV 402 and between the AV 402, the data center 450, the client computing device 470, and other remote systems. The communication stack 420 can enable the local computing device 410 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 420 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 422 can store HD maps and related data of the streets upon which the AV 402 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes;

etc.). The traffic controls lane can include geospatial information of traffic signal lights, traffic signs, and other road objects and related attributes.

The AV operational database 424 can store raw AV data generated by the sensor systems 404-408 and other components of the AV 402 and/or data received by the AV 402 from remote systems (e.g., the data center 450, the client computing device 470, etc.). In some embodiments, the raw AV data can include HD LIDAR point cloud data, image data, RADAR data, GPS data, and other sensor data that the data center 450 can use for creating or updating AV geospatial data as discussed further below with respect to FIG. 2 and elsewhere in the present disclosure.

The data center 450 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 450 can include one or more computing devices remote to the local computing device 410 for managing a fleet of AVs and AV-related services. For example, in addition to managing the AV 402, the data center 450 may also support a ridesharing service, a delivery service, a remote/roadside assistance service, street services (e.g., street mapping, street patrol, street cleaning, street metering, parking reservation, etc.), and the like.

The data center 450 can send and receive various signals to and from the AV 402 and client computing device 470. These signals can include sensor data captured by the sensor systems 404-408, roadside assistance requests, software updates, ridesharing pick-up and drop-off instructions, and so forth. In this example, the data center 450 includes a data management platform 452, an Artificial Intelligence/Machine Learning (AI/ML) platform 454, a simulation platform 456, a remote assistance platform 458, a ridesharing platform 460, and map management system platform 462, among other systems.

Data management platform 452 can be a "big data" system capable of receiving and transmitting data at high velocities (e.g., near real-time or real-time), processing a large variety of data, and storing large volumes of data (e.g., terabytes, petabytes, or more of data). The varieties of data can include data having different structure (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 450 can access data stored by the data management platform 452 to provide their respective services.

The AI/ML platform 454 can provide the infrastructure for training and evaluating machine learning algorithms for operating the AV 402, the simulation platform 456, the remote assistance platform 458, the ridesharing platform 460, the map management system platform 462, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

The simulation platform 456 can enable testing and validation of the algorithms, machine learning models, neural networks, and other development efforts for the AV 402, the remote assistance platform 458, the ridesharing platform 460, the map management system platform 462, and other platforms and systems. The simulation platform 456 can replicate a variety of driving environments and/or reproduce real-world scenarios from data captured by the AV 402, including rendering geospatial information and road infrastructure (e.g., streets, lanes, crosswalks, traffic lights, stop signs, etc.) obtained from the map management system platform 462; modeling the behavior of other vehicles, bicycles, pedestrians, and other dynamic elements; simulating inclement weather conditions, different traffic scenarios; and so on.

The remote assistance platform 458 can generate and transmit instructions regarding the operation of the AV 402. For example, in response to an output of the AI/ML platform 454 or other system of the data center 450, the remote assistance platform 458 can prepare instructions for one or more stacks or other components of the AV 402.

The ridesharing platform 460 can interact with a customer of a ridesharing service via a ridesharing application 472 executing on the client computing device 470. The client computing device 470 can be any type of computing system, including a server, desktop computer, laptop, tablet, smartphone, smart wearable device (e.g., smart watch, smart eyeglasses or other Head-Mounted Display (HMD), smart ear pods or other smart in-ear, on-ear, or over-ear device, etc.), gaming system, or other general purpose computing device for accessing the ridesharing application 472. The client computing device 470 can be a customer's mobile computing device or a computing device integrated with the AV 402 (e.g., the local computing device 410). The ridesharing platform 460 can receive requests to be picked up or dropped off from the ridesharing application 472 and dispatch the AV 402 for the trip.

Map management system platform 462 can provide a set of tools for the manipulation and management of geographic and spatial (geospatial) and related attribute data. The data management platform 452 can receive LIDAR point cloud data, image data (e.g., still image, video, etc.), RADAR data, GPS data, and other sensor data (e.g., raw data) from one or more AVs 402, UAVs, satellites, third-party mapping services, and other sources of geospatially referenced data. The raw data can be processed, and map management system platform 462 can render base representations (e.g., tiles (2D), bounding volumes (3D), etc.) of the AV geospatial data to enable users to view, query, label, edit, and otherwise interact with the data. Map management system platform 462 can manage workflows and tasks for operating on the AV geospatial data. Map management system platform 462 can control access to the AV geospatial data, including granting or limiting access to the AV geospatial data based on user-based, role-based, group-based, task-based, and other attribute-based access control mechanisms. Map management system platform 462 can provide version control for the AV geospatial data, such as to track specific changes that (human or machine) map editors have made to the data and to revert changes when necessary. Map management system platform 462 can administer release management of the AV geospatial data, including distributing suitable iterations of the data to different users, computing devices, AVs, and other consumers of HD maps. Map management system platform 462 can provide analytics regarding the AV geospatial data and related data, such as to generate insights relating to the throughput and quality of mapping tasks.

In some embodiments, the map viewing services of map management system platform 462 can be modularized and deployed as part of one or more of the platforms and systems of the data center 450. For example, the AI/ML platform 454 may incorporate the map viewing services for visualizing the effectiveness of various object detection or object classification models, the simulation platform 456 may incorporate the map viewing services for recreating and visualizing certain driving scenarios, the remote assistance platform 458 may incorporate the map viewing services for replaying traffic incidents to facilitate and coordinate aid, the ridesharing platform 460 may incorporate the map viewing services into the client application 472 to enable passengers to view the AV 402 in transit en route to a pick-up or drop-off location, and so on.

Figure 5:
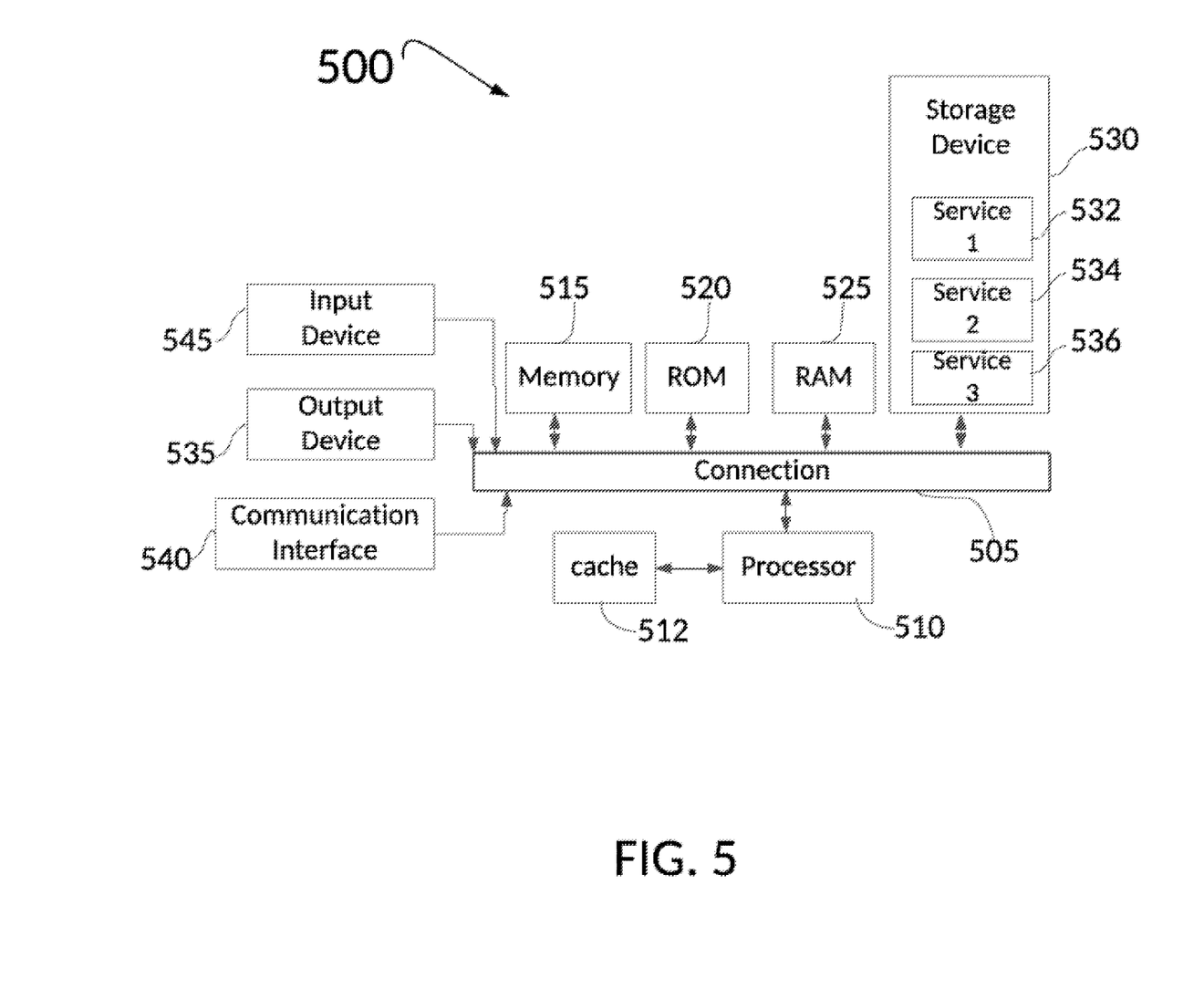
FIG. 5 illustrates an example processor-based system with which some aspects of the subject technology can be implemented.

FIG. 5 illustrates an example processor-based system with which some aspects of the subject technology can be implemented. For example, processor-based system 500 can be any computing device making up internal computing system 510, remote computing system 550, a passenger device executing the rideshare app 570, internal computing device 530, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/Re- RAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method for processing signals, the method comprising:
   receiving a plurality of radar signals reflected from one or more objects, the plurality of reflected radar signals associated with a first set of transmitted radar signals of a first operational mode of a radar apparatus, wherein the plurality of reflected radar signals are received from the one or more objects after transmission of the first set of transmitted radar signals;
   generating a first result based on performing a first set of calculations associated with phase offsets of the plurality of reflected radar signals and a first input parameter;
   generating a second result based on performing a second set of calculations associated with a field of view of the radar apparatus and the first input parameter;
   generating a combined result after assigning a weight to assign to at least one of the first result or the second result based on an a status of the input parameter associated with the phase offsets and the field of view, wherein the combined result is generated after the performance of the first and the second set of calculations; and
   performing an evaluation that identifies that the radar apparatus should be switched from the first operational mode to a second operational mode based on the combined result, wherein the radar apparatus is switched from the first operational mode to the second operational mode according to the identification that the radar apparatus should be switched from the first operational mode to the second operational mode.

2. The method of claim 1, further comprising generating a third result based on performing a third set of calculations associated with spectral content of the first set of transmitted radar signals.

3. The method of claim 2, further comprising:
identifying that radar energy from a second radar apparatus physically separate from the radar apparatus is being received that can interfere with the radar apparatus based on the spectral content of a current operational mode of the radar apparatus overlapping with spectral content of the received radar energy from the second radar apparatus; and
switching the radar apparatus from the current operational mode to a second operational mode of the radar apparatus to mitigate transmitting radar signals that overlap with the spectral content of the received radar energy.

4. The method of claim 2, further comprising generating a fourth result based on performing a fourth set of calculations associated with a range of a current operational mode of the radar apparatus, the fourth result corresponding to the range of the current operational mode of the radar apparatus.

5. The method of claim 4, wherein the combined result is a function of the first result, the second result, the weight assigned to the at least one of the first result or the second result, the third result, a weight assigned to the third result, the fourth result, and a weight assigned to the fourth result.

6. The method of claim 1, wherein calculations associated with the field of view are performed based on execution of instructions associated with an angular coverage calculator.

7. The method of claim 1, wherein the second operational mode includes a set of phase offsets of transmitted radar signals that are different from a group of phase offsets of the first operational mode.

8. The method of claim 1, wherein the first operational mode is associated with a first field of view and the second operational mode is associated with a second field of view.

9. The method of claim 1, further comprising;
transmitting radar signals of a first frequency associated with a third operational mode and with highway driving;
identifying an anomaly associated with reflected radar signals associated with the third operational mode; and
changing the operational mode to a fourth operational mode that transmits radar signals at a second frequency based on the identified anomaly.

10. A non-transitory computer-readable storage medium having embodied thereon a program executable by a processor for implementing a method for processing signals, the method comprising:
receiving a plurality of radar signals reflected from one or more objects, the plurality of reflected radar signals associated with a first set of transmitted radar signals of a first operational mode of a radar apparatus, wherein the plurality of reflected radar signals are received from the one or more objects after transmission of the first set of transmitted radar signals;
generating a first result based on performing a first set of calculations associated with phase offsets of the plurality of reflected radar signals and a first input parameter;
generating a second result based on performing a second set of calculations associated with a field of view of the radar apparatus and the first input parameter;
generating a combined result after assigning a weight to assign to at least one of the first result or the second result based on an a status of the input parameter associated with the phase offsets and the field of view, wherein the combined result is generated after the performance of the first and the second set of calculations; and
performing an evaluation that identifies that the radar apparatus should be switched from the first operational mode to a second operational mode based on the combined result, wherein the radar apparatus is switched from the first operational mode to a second operational mode according to the identification that the radar apparatus should be switched from the first operational mode to the second operational mode.

11. The non-transitory computer-readable storage medium of claim 10, the program further executable to generate a third result based on performing a third set of calculations associated with spectral content of the first set of transmitted radar signals.

12. The non-transitory computer-readable storage medium of claim 11, the program further executable to:
identify that radar energy from a second radar apparatus physically separate from the radar apparatus is being received that can interfere with the radar apparatus based on the spectral content of a current operational mode of the radar apparatus overlapping with spectral content of the received radar energy from the second radar apparatus; and
switch the radar apparatus from the current operational mode to a second operational mode of the radar apparatus to mitigate transmitting radar signals that overlap with the spectral content of the received radar energy.

13. The non-transitory computer-readable storage medium of claim 11, the program further executable to generate a fourth result based on performing a fourth set of calculations associated with a range of a current operational mode of the radar apparatus, the fourth result corresponding to the range of the current operational mode of the radar apparatus.

14. The non-transitory computer-readable storage medium of claim 13, wherein the combined result is a function of the first result, the second result, the weight assigned to the at least one of the first result or the second result, the third result, a weight assigned to the third result, the fourth result, and a weight assigned to the fourth result.

15. The non-transitory computer-readable storage medium of claim 10, wherein calculations associated with the field of view are performed based on execution of instructions associated with an angular coverage calculator.

16. The non-transitory computer-readable storage medium of claim 10, wherein the second operational mode includes a set of phase offsets of transmitted radar signals that are different from a group of phase offsets of the first operational mode.

17. The non-transitory computer-readable storage medium of claim 10, wherein the first operational mode is associated with a first field of view and the second operational mode is associated with a second field of view.

18. The non-transitory computer-readable storage medium of claim 10, the program further executable to:
transmit radar signals of a first frequency associated with a third operational mode and with highway driving;
identify an anomaly associated with reflected radar signals associated with the third operational mode; and
change the operational mode to a fourth operational mode that transmits radar signals at a second frequency based on the identified anomaly.

19. A radar apparatus for processing signals, the apparatus comprising:
an antenna that receives a plurality of radar signals reflected from one or more objects, the plurality of reflected radar signals associated with a first set of transmitted radar signals of a first operational mode of a radar apparatus, wherein the plurality of reflected radar signals are received from the one or more objects after transmission of the first set of transmitted radar signals;
a memory; and
a processor that executes instructions out of the memory to:
generate a first result based on performing a first set of calculations associated with phase offsets of the plurality of reflected radar signals and a first input parameter,
generate a second result based on performing a second set of calculations associated with a field of view of the radar apparatus and the first input parameter,
generate a combined result after assigning a weight to assign to at least one of the first result or the second result based on an a status of the input parameter associated with the phase offsets and the field of view, wherein the combined result is generated after the performance of the first and the second set of calculations, and
perform an evaluation that identifies that the radar apparatus should be switched from the first operational mode to a second operational mode based on the combined result, wherein the radar apparatus is switched from the first operational mode to a second operational mode according to the identification that the radar apparatus should be switched from the first operational mode to the second operational mode.

20. The method of claim 1, further comprising transmitting radar energy associated with the plurality of received radar signals.

* * * * *